(12) United States Patent
Hong

(10) Patent No.: US 11,646,587 B1
(45) Date of Patent: May 9, 2023

(54) BATTERY CHARGING METHOD AND DEVICE THEREOF

(71) Applicant: Jingxuan Hong, Shantou (CN)

(72) Inventor: Jingxuan Hong, Shantou (CN)

( * ) Notice: Subject to any disclaimer, the term of this patent is extended or adjusted under 35 U.S.C. 154(b) by 0 days.

(21) Appl. No.: 17/889,518

(22) Filed: Aug. 17, 2022

(30) Foreign Application Priority Data

Jul. 6, 2022 (CN) .......................... 202210788361.1

(51) Int. Cl.
*H02J 7/00* (2006.01)
*H02J 7/14* (2006.01)

(52) U.S. Cl.
CPC ...... *H02J 7/00041* (2020.01); *H02J 7/00047* (2020.01); *H02J 7/0049* (2020.01); *H02J 7/007182* (2020.01)

(58) Field of Classification Search
CPC .............. H02J 7/00041; H02J 7/00047; H02J 7/007182; H02J 7/0049
USPC .................................................... 320/150
See application file for complete search history.

(56) References Cited

U.S. PATENT DOCUMENTS

| | | | | |
|---|---|---|---|---|
| 4,745,349 A * | 5/1988 | Palanisamy | ......... | H02J 7/00038 320/147 |
| 2008/0036417 A1* | 2/2008 | Toya | ....................... | H02J 7/342 320/101 |
| 2013/0151181 A1* | 6/2013 | Sebastiani | ........... | H02J 7/00047 702/63 |
| 2014/0021959 A1* | 1/2014 | Maluf | .................... | H02J 7/0048 324/426 |
| 2015/0130419 A1* | 5/2015 | Zhai | ....................... | H02J 7/0071 320/112 |
| 2017/0264123 A1* | 9/2017 | Mulawski | ............... | H02J 9/062 |
| 2020/0014218 A1* | 1/2020 | Maluf | ................. | H02J 7/00041 |
| 2021/0091589 A1* | 3/2021 | Zhang | ................. | H02J 7/00714 |

* cited by examiner

*Primary Examiner* — Alexis B Pacheco
(74) *Attorney, Agent, or Firm* — Daniel M. Cohn; Howard M. Cohn

(57) ABSTRACT

A battery charging method and device thereof, relates to a technical field of battery charging, including steps of activating a battery to-be-charged, charging the battery to-be-charged in a low current short-charging mode having a preset time; after the preset time, detecting and obtaining a floating charge voltage value of the battery to-be-charged; if the floating charge voltage value is less than a first voltage threshold, determining that the battery to-be-charged is a nickel-hydrogen battery; if the floating charge voltage value is greater than the first voltage threshold, charging the battery to-be-charged in a constant current long-charging mode, turning off the constant current after reaching a preset voltage value, performing no-load detection on a real-time voltage of the battery to-be-charged, and obtaining a second voltage value of the battery to-be-charged when the real-time voltage drops to be unchanged.

20 Claims, 5 Drawing Sheets

BATTERY CHARGING METHOD AND DEVICE THEREOF

TECHNICAL FIELD

The present disclosure relates to a technical field of battery charging, and in particular to a battery charging method and a battery charging device.

BACKGROUND

Different batteries are charged using different methods, so that different types of batteries need to be equipped with special battery chargers. Most of current battery chargers are only configured to charge one single type of battery, and cannot be compatible with different specifications of batteries. Users need different battery chargers if there are multiple types of batteries. However, charging the batteries with wrong type battery chargers causes damage to the batteries or equipment, and may even cause security problems, such as fire and explosion.

At present, a 1.5V lithium battery charger is well configured by manufacturers, the 1.5V lithium battery charger directly outputs 5V voltage, and the 1.5V lithium battery charger is incompatible with a conventional lithium battery and a nickel-hydrogen battery. Wrongly placing the conventional lithium battery and the nickel-hydrogen battery may lightly lead to overcharge the conventional lithium battery and the nickel-hydrogen battery, or may severely cause damage to the battery charger or the battery, or may even cause the battery to explode. if placing a 1.5 V lithium battery in a conventional lithium battery charger or a nickel-hydrogen battery charger, the 1.5 V lithium battery may not be fully charged or directly refuse to charge.

SUMMARY

The present disclosure provides a battery charging method and device thereof, and aims to solve problems in the background.

In order to achieve above purpose, the present disclosure provides a battery charging method, including:

activating a battery to-be-charged, charging the battery to-be-charged in a low current short-charging mode having a preset time; after the preset time, detecting and obtaining a floating charge voltage value of the battery to-be-charged; if the floating charge voltage value is less than a first voltage threshold, determining that the battery to-be-charged is a nickel-hydrogen battery;

if the floating charge voltage value is greater than the first voltage threshold, charging the battery to-be-charged in a constant current long-charging mode, turning off the constant current after reaching a preset voltage value, performing no-load detection on a real-time voltage of the battery to-be-charged, and obtaining a second voltage value of the battery to-be-charged when the real-time voltage drops to be unchanged;

if the second voltage value is within a first preset voltage range value, determining that the battery to-be-charged is a conventional lithium battery; and if the second voltage value is within a second preset voltage range value, determining that the battery to-be-charged is a constant-voltage lithium battery.

Furthermore, the battery to-be-charged is the nickel-hydrogen battery, entering the battery to-be-charged into a nickel-hydrogen battery charging mode; when a current charging voltage of the nickel-hydrogen battery reaches a first nickel-hydrogen voltage value, determining that a voltage of the battery to-be-charged is fully charged; and when the current charging voltage of the nickel-hydrogen battery reaches a second nickel-hydrogen voltage value, determining that the voltage of the battery to-be-charged is hilly charged after a preset delay time.

Furthermore, when the battery to-be-charged is the conventional lithium battery, entering the battery to-be-charged into a. conventional lithium battery charging mode, and performing current dropping charging from constant current to constant voltage. If a current charging voltage of the conventional lithium battery reaches a conventional lithium voltage value, determining that a voltage of the conventional lithium battery is fully charged.

Furthermore, when the battery to-be-charged is the constant-voltage lithium battery, entering the battery to-be-charged into a constant-voltage lithium battery charging mode. if a charging current preset in the constant-voltage lithium battery is automatically turned off, determining that a voltage of the constant-voltage lithium battery is fully charged.

Furthermore, the determining that the battery to-be-charged is the conventional lithium battery enables to be replaced with following.

When the second voltage value is within a third preset voltage range value, determining that the battery to-be-charged is a lithium iron phosphate battery, where the third preset voltage range value is within the first preset voltage range value. When the battery to-be-charged is the lithium iron phosphate battery, entering the battery to-be-charged into a lithium iron phosphate battery charging mode, and lowering current from constant current to constant voltage; if a current charging voltage of the lithium iron phosphate battery reaches a lithium iron phosphate voltage value, determining that a voltage of the lithium iron phosphate battery is fully charged.

Furthermore, the activating the battery to-be-charged includes pulsing the battery to-be-charged with current at a preset interval time to rise a voltage of the battery to-be-charged and activate the battery to-be-charged.

In addition, in order to achieve the above purpose, the present disclosure further provides a battery charging device, configured to a battery to-be-charged that is arranged, including a microprogrammed control unit (MCU), a charging driving circuit module, a charging switch circuit module, a voltage detecting module, and a current detecting module. The MCU is electrically connected to the charging driving circuit module, the charging switch circuit module, the voltage detecting module, and the current detecting module, and the MCU achieves any one of the above-mentioned battery charging methods.

Furthermore, the MCU controls the charging driving circuit module and the charging switch circuit module to pulse the battery to-be-charged with current at a preset interval time to rise a voltage of the battery to-be-charged and activate the battery to-be-charged.

Furthermore, the voltage detecting module is configured to collect a voltage value at each of two ends of the battery to-be-charged and transmit the voltage value to the MCU. The current detecting module is configured to collect a current value of the battery to-be-charged and transmit the current value to the MCU. The MCU enters different charging modes according to the voltage value collected by the voltage detecting module and the current value collected by the current detecting module. The charging modes include a nickel-hydrogen battery charging mode, a conventional lithium battery charging mode, and a constant-voltage lithium battery charging mode. The conventional lithium battery charging mode enables to be replaced with a lithium iron phosphate battery charging mode.

Furthermore, the MCU controls the charging driving circuit module and the charging switch circuit module to charge or stop charging the battery to-be-charged according to different charging modes, the voltage value collected by the voltage detecting module, and the current value collected by the current detecting module.

Compared with prior art, the present disclosure has following beneficial effects.

The present disclosure provides the battery charging method and the battery charging device. After activating the battery to-be-charged, charging the battery to-be-charged in the low current short-charging mode having the preset time. After the preset time, detecting and obtaining the floating charge voltage value of the battery to-be-charged. If the floating charge voltage value is less than the first voltage threshold, determining that the battery to-be-charged is the nickel-hydrogen battery. If the floating charge voltage value is greater than the first voltage threshold, charging the battery to-be-charged in the constant current long-charging mode, turning off the constant current after reaching the preset voltage value, performing no-load detection on the real-time voltage of the battery to-be-charged, and obtaining the second voltage value of the battery to-be-charged when the real-time voltage drops to be unchanged. If the second voltage value is within the first preset voltage range value, determining that the battery to-be-charged is the conventional lithium battery. If the second voltage value is within the second preset voltage range value, determining that the battery to-be-charged is the constant-voltage lithium battery.

The present disclosure activates the battery to-be-charged through a pulse current at an interval time, enters the battery to-be-charged into the nickel-hydrogen battery charging mode, the conventional lithium battery charging mode, or the constant-voltage lithium battery charging mode according to the voltage value collected by the voltage detecting module and the current value collected by the current detecting module, determines whether the battery to-be-charged is fully charged or not, and then achieves compatible charging and use safety of batteries with different specifications.

In order to more clearly illustrate structural features and effects of the present disclosure, the present disclosure is described in detail below with reference to accompanying drawings and specific embodiments.

Figure 1:
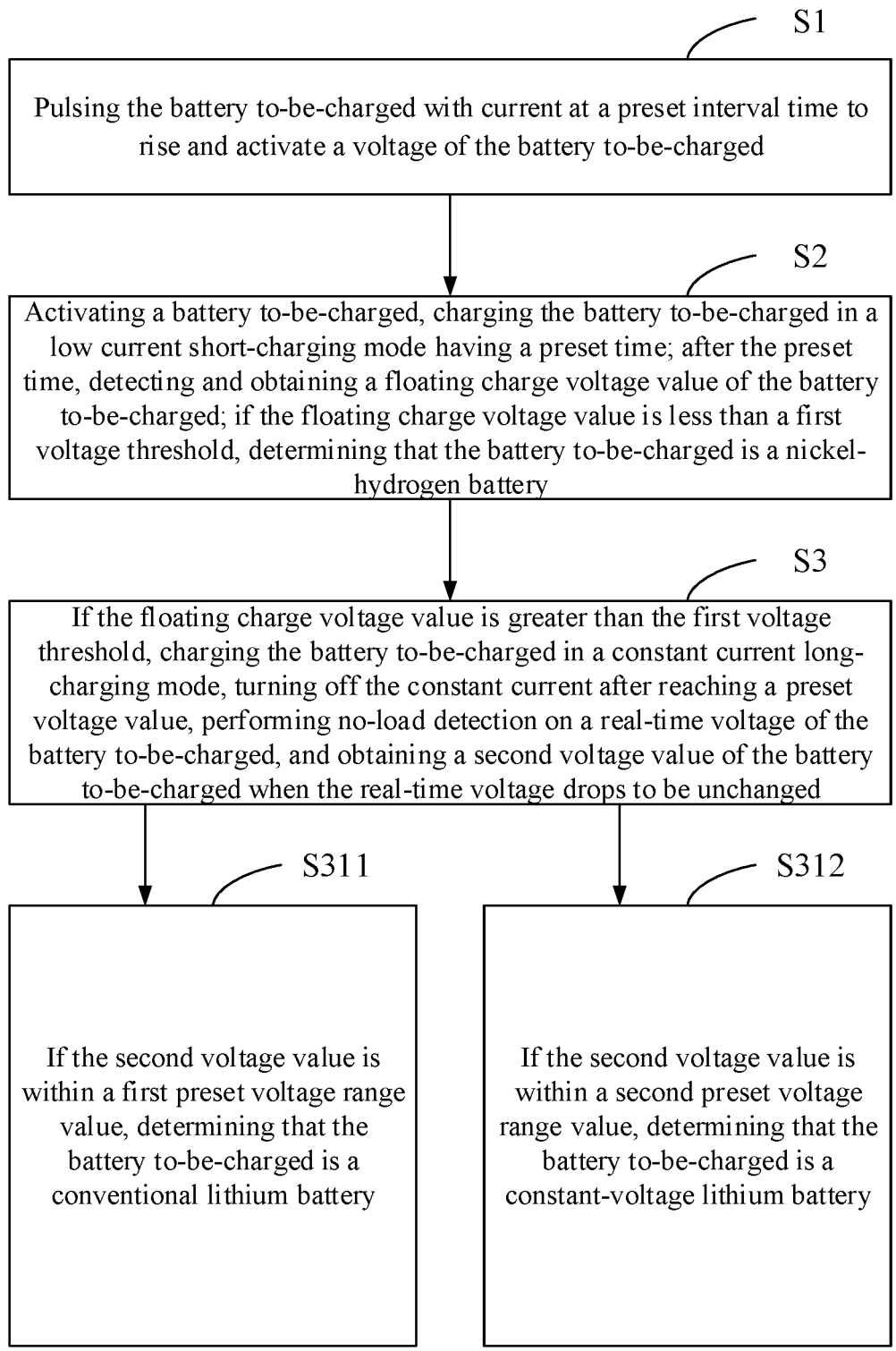
FIG. 1 is a first flow schematic diagram of a battery charging method according to one embodiment of the present disclosure.

Reference number in the drawings: 1, microprogrammed control unit (MCU); 2, charging driving circuit module; 3, charging switch circuit module; 4, voltage detecting module; 5, current detecting module; 6, battery to-be-charged.

DETAILED DESCRIPTION

Unless otherwise defined, all technical and scientific terms used herein have a same meaning as commonly understood by one of ordinary skill in art to which the present disclosure belongs. The terms used in the description in the present disclosure are only to describe purposes of specific embodiments, not to limit the present disclosure. The terms "including" and "having" and any variations thereof are intended to cover non-exclusive inclusion. The terms "first", "second" and the like in the description, claims, or drawings of the present disclosure are configured to distinguish different objects, and are not configured to describe a specific sequence.

Reference herein to "embodiment" means that particular features, structures, or characteristics described in connection with an embodiment, which are included in at least one embodiment of the present disclosure. Appearances of the phrase "embodiment" in various places in the specification are not necessarily all referring to the same embodiment, nor are separate or alternative embodiments mutually exclusive of other embodiments. It is explicitly and implicitly understood by those skilled in the art that the embodiments described herein are combined with other embodiments.

Currently, many chargers on market are designed and produced according to corresponding models of batteries. Users take it for granted that there may be no problems if the chargers normally work after being plugged in, however, a certain hidden safety hazard exists. Therefore, the present disclosure sorts out many existing chargers to obtain corresponding charging results about charging different batteries with different chargers, as follows:

|  | 1.5 V lithium battery special charger | Nickel-hydrogen and conventional lithium battery charger |
| --- | --- | --- |
| 1.5 V lithium battery | Normal charge | Not fully charge |
| Nickel-hydrogen battery | Overcharge or refuse to charge (having safety hazard) | Normal charge |
| Conventional lithium battery | Overcharge or refuse to charge (having safety hazard) | Normal charge |

Figure 5:
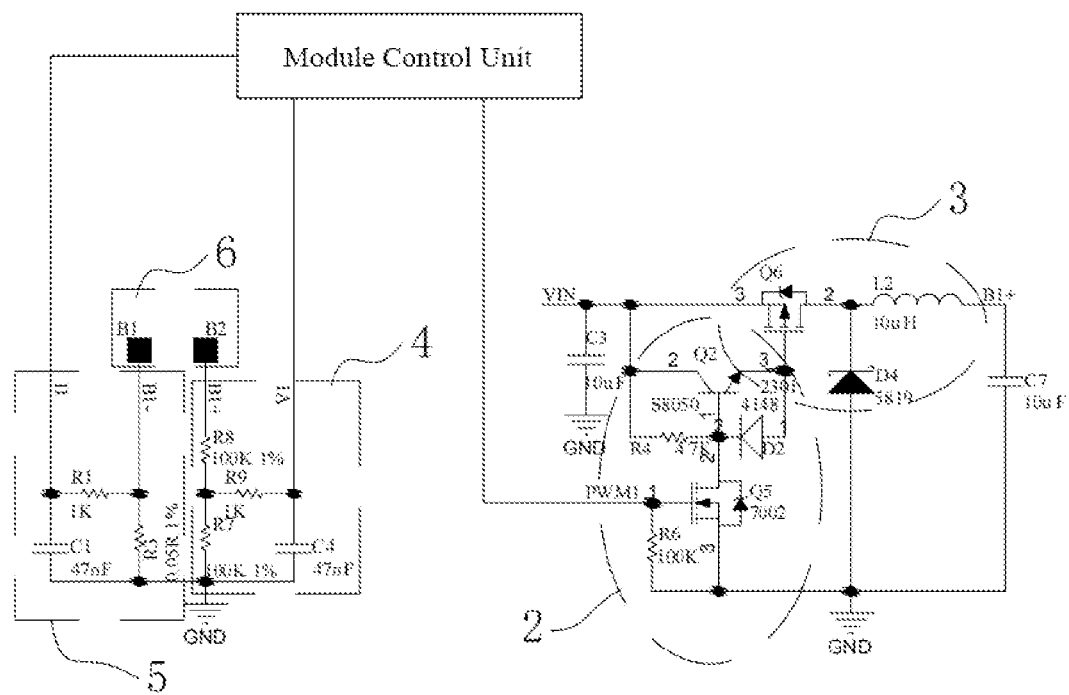
FIG. 5 is a schematic diagram of a connection structure of a battery charging device according to one embodiment of the present disclosure.

In order to achieve the above purposes, one embodiment of the present disclosure provides a battery charging device, as shown in FIG. 5, configured to charging battery to-be-charged 6 that is arranged, including an MCU 1, a charging driving circuit module 2, a charging switch circuit module 3, a voltage detecting module 4, and a current detecting module 5. The MCU 1 is electrically connected to the charging driving circuit module 2, the charging switch circuit module 3, the voltage detecting module 4, and the current detecting module 5.

Furthermore, the MCU 1 controls the charging driving circuit module 2 and the charging switch circuit module 3 to pulse the battery to-be-charged 6 with current at a preset interval time to rise a voltage of the battery to-be-charged 6 and activate the battery to-be-charged 6.

Furthermore, the voltage detecting module 4 is configured to collect a voltage value at each of two ends of the battery to-be-charged 6 and transmit the voltage value to the MCU 1. The current detecting module 5 is configured to collect a.

current value of the battery to-be-charged 6 and transmit the current value to the MCU 1. The MCU 1 enters different charging modes according to the voltage value collected by the voltage detecting module 4 and the current value collected by the current detecting module 5. The charging modes include a nickel-hydrogen battery charging mode, a conventional lithium battery charging mode, and a constant-voltage lithium battery charging mode.

In some embodiments, the conventional lithium battery charging mode enables to be replaced with a lithium iron phosphate battery charging mode, so as to form a battery charging device including the nickel-hydrogen battery charging mode, the lithium iron phosphate battery charging mode, and the constant-voltage lithium battery charging mode.

Furthermore, the MCU 1 controls the charging driving circuit module 2 and the charging switch circuit module 3 to charge or stop charging the battery to-be-charged 6 according to different charging modes, the voltage value collected by the voltage detecting module 4, and the current value collected by the current detecting module 5.

For example, in the embodiment, pulsing the battery to-be-charged 6 every one second interval with a current of 20 mA to rise the voltage at each of the two ends of the battery to-be-charged 6 to further activate the battery to-be-charged 6, which facilitates subsequent current voltage sampling. The voltage detecting module 4 collects the voltage at each of the two ends of the battery- to-be-charged 6 to obtain the voltage value. The MCU 1 intelligently classifies the battery to-be-charged 6 according to the voltage value. If the floating charge voltage value is within 2.2V, the battery to-be-charged 6 is a 1.2V nickel-hydrogen battery. After charging the battery to-be-charged 6 to 4.2V for a long time, if a no-load voltage is between 1.5V and 1.651% after the current is turned off, the battery to-be-charged 6 is a 1.5V constant-voltage lithium battery. If the voltage is between 4V and 4.2V, the battery to-be-charged 6 is a 3.7V conventional lithium battery. The MCU 1 controls the charging driving circuit module 2 and the charging switch circuit module 3 to charge or stop charging the battery to-be-charged 6 according to different charging modes, the voltage value collected by the voltage detecting module 2, and the current value collected by the current detecting module 3. The floating charge voltage refers to a battery voltage when there is a current passing through, and the no-load voltage refers to a battery voltage when there is no current passing through.

In addition, in a charging embodiment, if the conventional lithium battery is defined as a lithium iron phosphate battery, and if the voltage is between 2.2V and 3.6V, the battery to-be-charged 6 is a 3.2V lithium iron phosphate battery. The lithium iron phosphate battery replaces a common lithium battery, and the lithium iron phosphate battery in combination with the 1.2 V nickel-hydrogen battery and a 1.5V constant-voltage battery may further form different charging modes.

Figure 2:
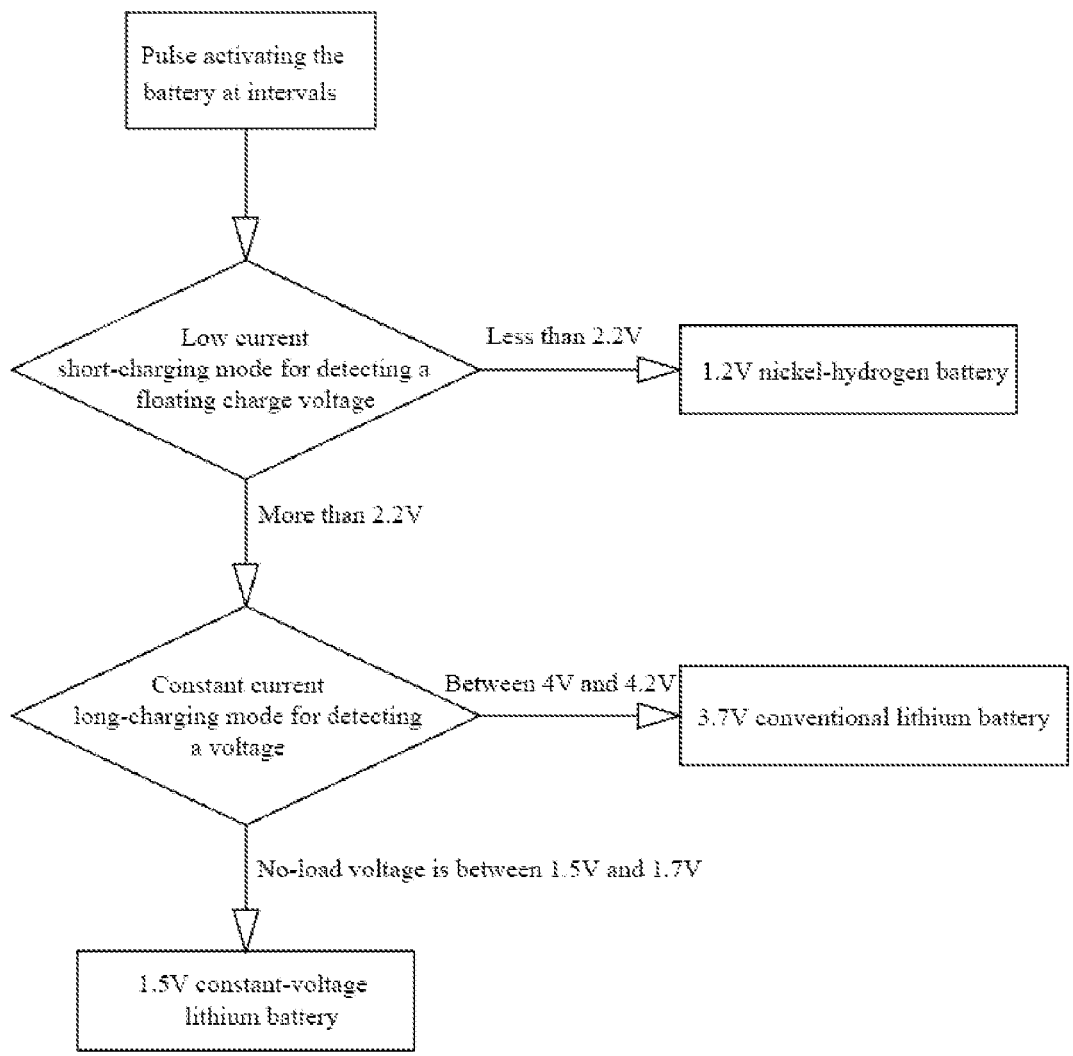
FIG. 2 is a first guide schematic diagram of the battery charging method according to one embodiment of the present disclosure.

In addition, in order to achieve the above purposes, the present disclosure further provides a battery charging method, as shown in FIG. 1 and FIG. 2, applying to any one of the above charging devices, including following steps.

S1: pulsing the battery to-be-charged with current at a preset interval time to rise a voltage of the battery to-be-charged and activate the battery to-be-charged.

For example, the preset interval time is set as one second, and current is 20 mA. The current flows from a first end of the battery to-be-charged to a second end of the battery to-he-charged, forming a work method with multi-time current pulses, so that the voltage value of each of the two ends of the battery to-be-charged continuously rises to activate.

S2: activating the battery to-be-charged, charging the battery to-be-charged in a low current short-charging mode having a preset time. After the preset time, detecting and obtaining the floating charge voltage value of the battery to-be-charged. If the floating charge voltage value is less than a first voltage threshold, determining that the battery to-be-charged is the nickel-hydrogen battery.

For example, the preset time is set as thirty seconds, and the low current short-charging mode is that charging the battery to-be-charged with a small current of 20 mA for thirty seconds. The MCU controls the charging switch circuit module to be turned off at thirty seconds, and if the floating charge voltage value at each of the two ends of the battery to-be-charged is detected to be 2.2V, the battery to-be-charged is determined as the 1.2V nickel-hydrogen battery.

Furthermore, the battery to-he-charged is the nickel-hydrogen battery, entering the battery to-be-charged into the nickel-hydrogen battery charging mode. When a current charging voltage of the nickel-hydrogen battery reaches a first nickel-hydrogen voltage value, where a negative voltage or an inflection point voltage appears for example, determining that a voltage of the battery to-be-charged is hilly charged.

When the current charging voltage of the nickel-hydrogen battery reaches a second nickel-hydrogen voltage value, taking 1.47V or 1.48V for example, determining that the voltage of the battery to-be-charged is fully charged after a preset delay time, taking twenty minutes delay for example. The second nickel-hydrogen voltage value is a safety judgment and supplement made when the first nickel-hydrogen voltage value does not appear and is configured to determine whether a passivation old battery is fully charged or not, taking 1.6V and 2.2V for example, and the second nickel-hydrogen voltage value is greater than the first nickel-hydrogen voltage value.

S3: if the floating charge voltage value is greater than the first voltage threshold, charging the battery to-be-charged in a constant current long-charging mode, turning off the constant current after reaching a preset voltage value, performing no-load detection on a real-time voltage of the battery to-be-charged, and obtaining a second voltage value of the battery to-be-charged when the real-time voltage drops to be unchanged.

In the embodiment, the first voltage threshold is set as 2.2V. The constant current long-charging is that charging the battery to-be-charged with a constant current of milliamps. After the voltage at the two ends of the battery to-be-charged reaches a full-electric voltage of a common battery, automatically closing the current, and unloading the voltage at the two ends of the battery to-be-charged to balance. Obtaining an actual voltage at the two ends of the battery to-be-charged as the second voltage value through the voltage detecting module.

S311: if the second voltage value is within a first preset voltage range value, determining that the battery to-be-charged is the conventional lithium battery.

For example, the first preset voltage range value is set as 4.0V to 4.2V, and the battery to-be-charged is the conventional lithium battery. Specifically, when the battery to-be-charged is the conventional lithium battery, entering the battery to-be-charged into the conventional lithium battery charging mode, and lowering current from constant current to constant voltage. If a current charging voltage of the conventional lithium battery reaches a conventional lithium voltage value, taking that the voltage value of the 3.7 V conventional lithium battery is 4.2 V for example, determining that the voltage of the conventional lithium battery is fully charged, taking that the voltage of the conventional lithium battery is 3.6 V or 3.7 V for example.

S312: if the second voltage value is within a second preset voltage range value, determining that the battery to-be-charged is a constant-voltage lithium battery.

For example, if the second preset voltage range value is set from 1.5V to 1.7V with a no-load voltage, determining that the battery to-be-charged is the constant-voltage lithium battery.

Specifically, when the battery to-be-charged is the constant-voltage lithium battery, entering the battery to-be-charged into a constant-voltage lithium battery charging mode. If a charging current preset in the constant-voltage lithium battery is automatically turned off, determining that a voltage of the constant-voltage lithium battery is fully charged.

In summary, the present disclosure provides the battery charging method and the battery charging device, activating the battery to-be-charged through a pulse current at the interval time, entering the battery to-be-charged into the nickel-hydrogen battery charging mode, the conventional lithium battery charging mode, or the constant-voltage lithium battery charging mode according to the voltage value collected by the voltage detecting module 2 and the current value collected by the current detecting module 3, confirming whether the battery to-be-charged is fully charged or not, and achieving compatible charging and use safety of batteries with different specifications.

Figure 3:
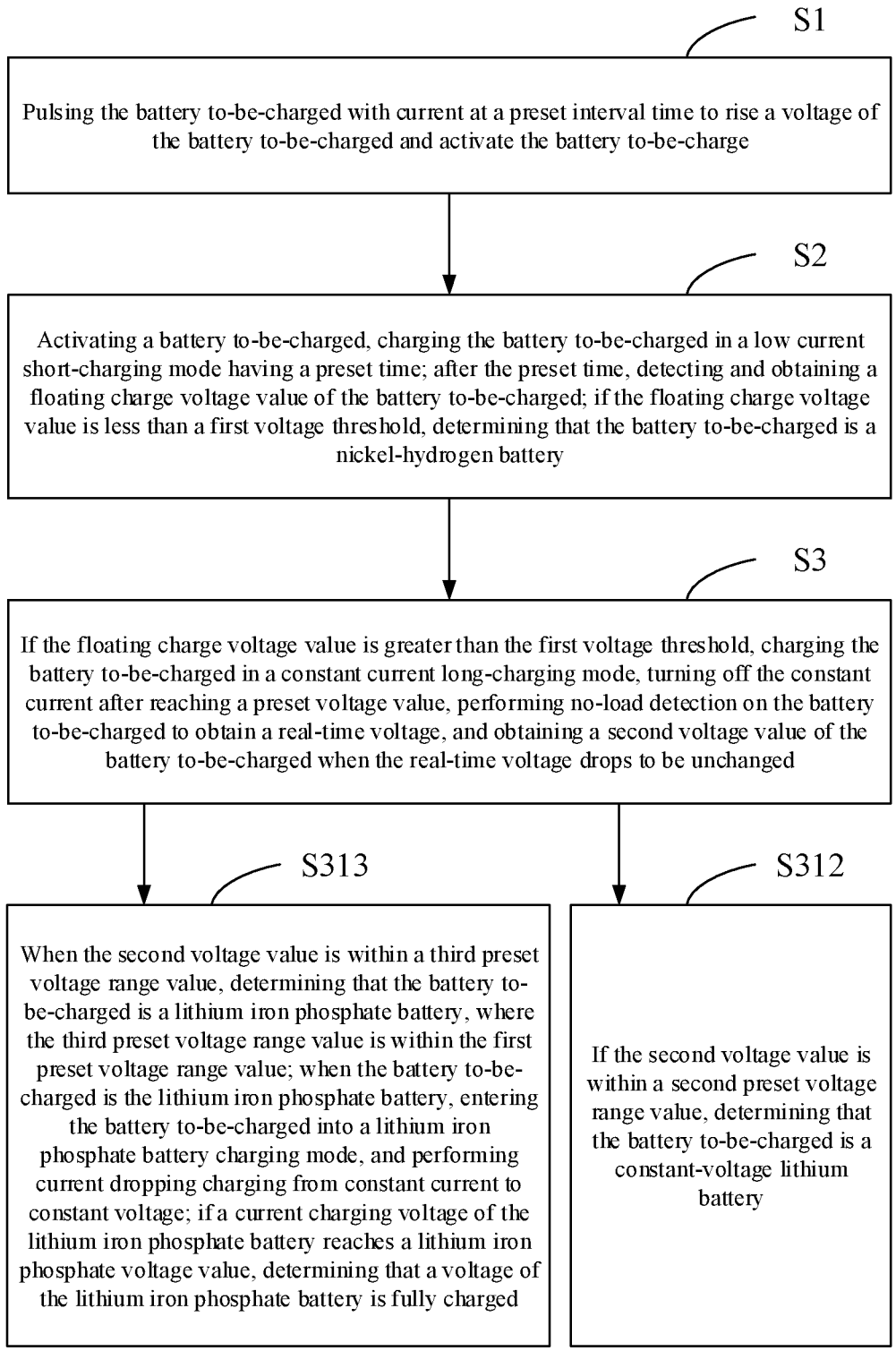
FIG. 3 is a second flow schematic diagram of the battery charging method according to one embodiment of the present disclosure.
Figure 4:
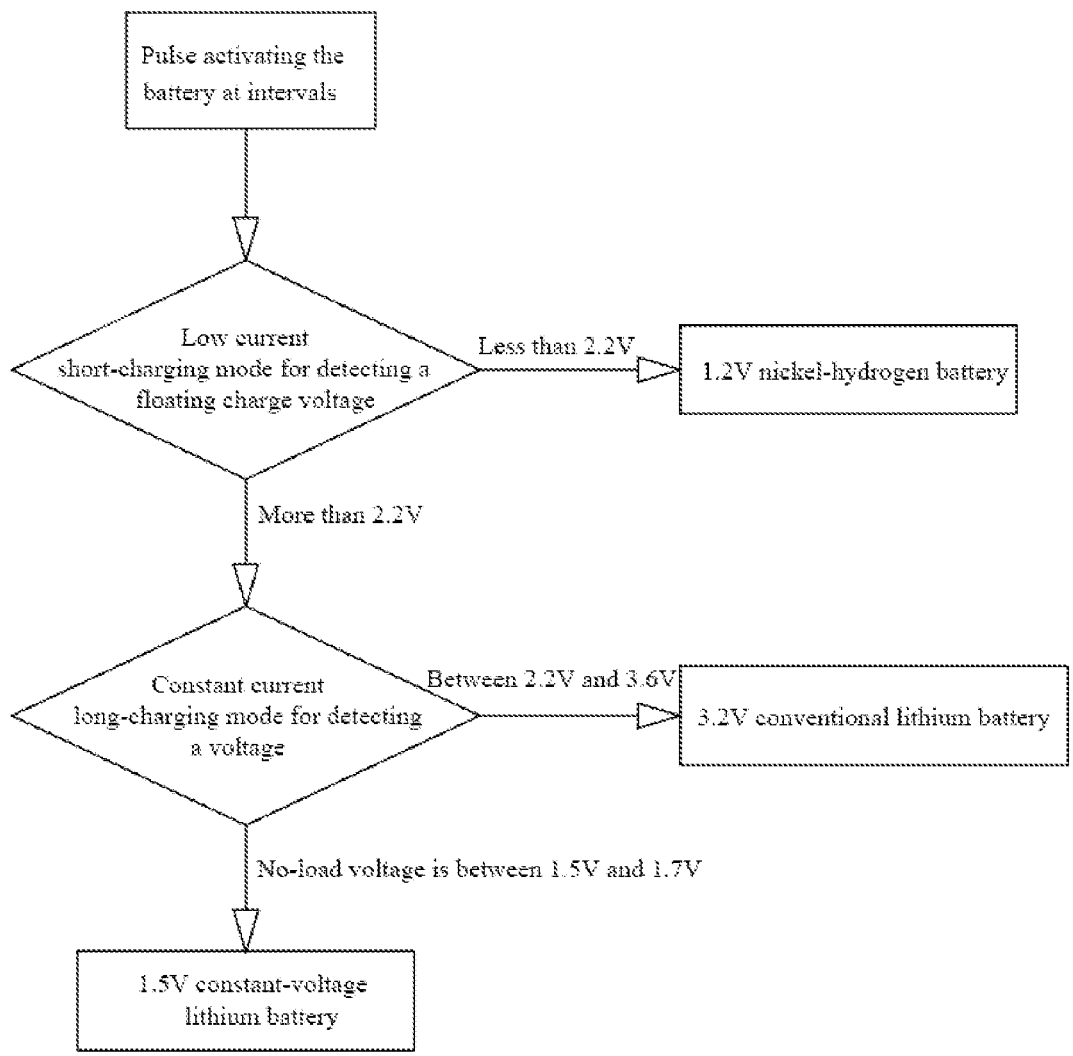
FIG. 4 is a second guide schematic diagram of the battery charging method according to one embodiment of the present disclosure.

As shown in FIG. 3 and FIG. 4, the battery charging method of the present disclosure further includes a step S313. The step S313 enables to replace a step S311. That is, a determination of the conventional lithium battery in the step S311 enables to be replaced with a determination of the lithium iron phosphate battery in step S313. Specifically, if the second voltage value is within a third preset voltage range value, determining that the battery to-be-charged is the lithium iron phosphate battery, and the third preset voltage range value is within the first preset voltage range value.

For example, the second voltage value is within a third preset voltage range value from 2.2V to 3.6V and determining that the battery to-be-charged is a 3.2V lithium iron phosphate battery if the voltage is between 2.2V and 3.6V. Specifically, when the battery to-be-charged is the lithium iron phosphate battery, entering the battery to-be-charged into a lithium iron phosphate battery charging mode, and lowering current from the constant current to the constant voltage. If a current charging voltage of the lithium iron phosphate battery reaches a lithium iron phosphate voltage value, taking the lithium iron phosphate voltage value is 3.6 V for example, determining that a. voltage of the lithium iron phosphate battery is fully charged, taking that the voltage of the lithium iron phosphate battery is fully charged to 3.2V for example.

In addition, in a charging embodiment, if the conventional lithium battery is defined as the lithium iron phosphate battery, and if the voltage is between 2.2V and 3.6V, determining that the battery to-be-charged 6 is a 3.2V lithium iron phosphate battery. The lithium iron phosphate battery replaces the common lithium battery, and the lithium iron phosphate battery in combination with the 1.2V nickel-hydrogen battery and the 1.5V constant-voltage battery may further form the different charging modes.

In summary, the present disclosure provides the battery charging method and device thereof, which activates the battery to-be-charged through a pulse current at, the interval time, enters the battery to-be-charged into the nickel-hydrogen battery charging mode, the conventional lithium battery charging mode, or the constant-voltage lithium battery charging mode according to the voltage value collected by the voltage detecting module 2 and the collected current value collected by the current detecting module 3, confirms whether the battery to-be-charged is fully charged or not, and finally achieves compatible charging and use safety of batteries with different specifications.

Technical principles of the present disclosure are described above with reference to the specific embodiments, which are merely preferred embodiments of the present disclosure. A protection scope of the present disclosure is not limited to the above embodiments, and technical solutions of the present disclosure belong to the protection scope of the present disclosure. A person skilled in the art would not have been able to associate other specific embodiments of the present disclosure without involving any inventive effort, and the embodiments are all within the protection scope of the present disclosure.

What is claimed is:

1. A battery charging method, comprising:
   activating a battery to-be-charged, pulsing the battery to-be-charged with current at a preset interval time to rise a voltage of the battery to-be-charged and activate the battery to-be-charged, charging the battery to-be-charged in a low current short-charging mode having a preset time; after the preset time, detecting and obtaining a floating charge voltage value of the battery to-be-charged; if the floating charge voltage value is less than a first voltage threshold, determining that the battery to-be-charged is a nickel-hydrogen battery, wherein the battery to-be-charged is the nickel-hydrogen battery, entering the battery to-be-charged into a nickel-hydrogen battery charging mode; when a current charging voltage of the nickel-hydrogen battery reaches a first nickel-hydrogen voltage value, determining that a voltage of the battery to-be-charged is fully charged; and
   when the current charging voltage of the nickel-hydrogen battery reaches a second nickel-hydrogen voltage value, determining that the voltage of the battery to-be-charged is fully charged after a preset delay time;
   if the floating charge voltage value is greater than the first voltage threshold, charging the battery to-be-charged in a constant current long-charging mode, turning off the constant current after reaching a preset voltage value, performing no-load detection on the battery to-be-charged to obtain a real-time voltage, and obtaining a second voltage value of the battery to-be-charged when the real-time voltage drops to be unchanged;
   if the second voltage value is within a first preset voltage range value, determining that the battery to-be-charged is a conventional lithium battery; and
   if the second voltage value is within a second preset voltage range value, determining that the battery to-be-charged is a constant-voltage lithium battery.

2. The battery charging method according to claim 1, wherein when the battery to-be-charged is the conventional lithium battery, entering the battery to-be-charged into a conventional lithium battery charging mode, and lowering current from constant current to constant voltage; if a current charging voltage of the conventional lithium battery reaches a conventional lithium voltage value, determining that a voltage of the conventional lithium battery is fully charged.

3. The battery charging method according to claim 1, wherein when the battery to-be-charged is the constant-voltage lithium battery, entering the battery to-be-charged into a constant-voltage lithium battery charging mode; if a charging current preset in the constant-voltage lithium battery is automatically turned off, determining that a voltage of the constant-voltage lithium battery is fully charged.

4. The battery charging method according to claim 1, wherein the determining that the battery to-be-charged is the conventional lithium battery enables to be replaced with following:
when the second voltage value is within a third preset voltage range value, determining that the battery to-be-charged is a lithium iron phosphate battery, where the third preset voltage range value is within the first preset voltage range value; when the battery to-be-charged is the lithium iron phosphate battery, entering the battery to-be-charged into a lithium iron phosphate battery charging mode, and lowering current from constant current to constant voltage; if a current charging voltage of the lithium iron phosphate battery reaches a lithium iron phosphate voltage value, determining that a voltage of the lithium iron phosphate battery is fully charged.

5. A battery charging device, configured to charge a battery to-be-charged that is arranged, comprising:
a microprogrammed control unit (MCU);
a charging driving circuit module;
a charging switch circuit module;
a voltage detecting module; and
a current detecting module;
wherein the MCU is electrically connected to the charging driving circuit module, the charging switch circuit module, the voltage detecting module, and the current detecting module, and the MCU achieves the battery charging method according to claim 1.

6. The battery charging device according to claim 5, wherein the MCU controls the charging driving circuit module and the charging switch circuit module to pulse the battery to-be-charged with current at a preset interval time to rise a voltage of the battery to-be-charged and activate the battery to-be-charged.

7. The battery charging device according to claim 6, wherein the voltage detecting module is configured to collect a voltage value at each of two ends of the battery to-be-charged and transmit the voltage value to the MCU; the current detecting module is configured to collect a current value of the battery to-be-charged and transmit the current value to the MCU;
the MCU enters different charging modes according to the voltage value collected by the voltage detecting module and the current value collected by the current detecting module; the different charging modes comprise a nickel-hydrogen battery charging mode, a conventional lithium battery charging mode, and a constant-voltage lithium battery charging mode; and the conventional lithium battery charging mode enables to be replaced with a lithium iron phosphate battery charging mode.

8. The battery charging device according to claim 7, wherein the MCU controls the charging driving circuit module and the charging switch circuit module to charge or stop charging the battery to-be-charged according to different charging modes, the voltage value collected by the voltage detecting module, and the current value collected by the current detecting module.

9. A battery charging method, comprising:
activating a battery to-be-charged, pulsing the battery to-be-charged with current at a preset interval time to rise a voltage of the battery to-be-charged and activate the battery to-be-charged, charging the battery to-be-charged in a low current short-charging mode having a preset time; after the preset time, detecting and obtaining a floating charge voltage value of the battery to-be-charged; if the floating charge voltage value is less than a first voltage threshold, determining that the battery to-be-charged is a nickel-hydrogen battery;
if the floating charge voltage value is greater than the first voltage threshold, charging the battery to-be-charged in a constant current long-charging mode, turning off the constant current after reaching a preset voltage value, performing no-load detection on the battery to-be-charged to obtain a real-time voltage, and obtaining a second voltage value of the battery to-be-charged when the real-time voltage drops to be unchanged;
if the second voltage value is within a first preset voltage range value, determining that the battery to-be-charged is a conventional lithium battery; and
if the second voltage value is within a second preset voltage range value, determining that the battery to-be-charged is a constant-voltage lithium battery, wherein when the battery to-be-charged is the conventional lithium battery, entering the battery to-be-charged into a conventional lithium battery charging mode, and lowering current from constant current to constant voltage; if a current charging voltage of the conventional lithium battery reaches a conventional lithium voltage value, determining that a voltage of the conventional lithium battery is fully charged.

10. The battery charging method according to claim 9, wherein the battery to-be-charged is the nickel-hydrogen battery, entering the battery to-be-charged into a nickel-hydrogen battery charging mode; when a current charging voltage of the nickel-hydrogen battery reaches a first nickel-hydrogen voltage value, determining that a voltage of the battery to-be-charged is fully charged; and
when the current charging voltage of the nickel-hydrogen battery reaches a second nickel-hydrogen voltage value, determining that the voltage of the battery to-be-charged is fully charged after a preset delay time.

11. The battery charging method according to claim 9, wherein when the battery to-be-charged is the constant-voltage lithium battery, entering the battery to-be-charged into a constant-voltage lithium battery charging mode; if a charging current preset in the constant-voltage lithium battery is automatically turned off, determining that a voltage of the constant-voltage lithium battery is fully charged.

12. The battery charging method according to claim 9, wherein the determining that the battery to-be-charged is the conventional lithium battery enables to be replaced with following:
when the second voltage value is within a third preset voltage range value, determining that the battery to-be-charged is a lithium iron phosphate battery, where the third preset voltage range value is within the first preset voltage range value; when the battery to-be-charged is the lithium iron phosphate battery, entering the battery to-be-charged into a lithium iron phosphate battery charging mode, and lowering current from constant current to constant voltage; if a current charging voltage of the lithium iron phosphate battery reaches a lithium iron phosphate voltage value, determining that a voltage of the lithium iron phosphate battery is fully charged.

13. A battery charging device, configured to charge a battery to-be-charged that is arranged, comprising:
a microprogrammed control unit (MCU);
a charging driving circuit module;
a charging switch circuit module;
a voltage detecting module; and
a current detecting module;
wherein the MCU is electrically connected to the charging driving circuit module, the charging switch circuit module, the voltage detecting module, and the current detecting module, and the MC U achieves the battery charging method according to claim 9.

14. The battery charging device according to claim 13, wherein the MCU controls the charging driving circuit module and the charging switch circuit module to pulse the battery to-be-charged with current at a preset interval time to rise a voltage of the battery to-be-charged and activate the battery to-be-charged.

15. A battery charging method, comprising:
activating a battery to-be-charged, pulsing the battery to-be-charged with current at a preset interval time to rise a voltage of the battery to-be-charged and activate the battery to-be-charged, charging the battery to-be-charged in a low current short-charging mode having a preset time; after the preset time, detecting and obtaining a floating charge voltage value of the battery to-be-charged; if the floating charge voltage value is less than a first voltage threshold, determining that the battery to-be-charged is a nickel-hydrogen battery;
if the floating charge voltage value is greater than the first voltage threshold, charging the battery to-be-charged in a constant current long-charging mode, turning off the constant current after reaching a preset voltage value, performing no-load detection on the battery to-be-charged to obtain a real-time voltage, and obtaining a second voltage value of the battery to-be-charged when the real-time voltage drops to be unchanged;
if the second voltage value is within a first preset voltage range value, determining that the battery to-be-charged is a conventional lithium battery, wherein when the battery to-be-charged is the constant-voltage lithium battery, entering the battery to-be-charged into a constant-voltage lithium battery charging mode; if a charging current preset in the constant-voltage lithium battery is automatically turned off, determining that a voltage of the constant-voltage lithium battery is fully charged; and
if the second voltage value is within a second preset voltage range value, determining that the battery to-be-charged is a constant-voltage lithium battery.

16. The battery charging method according to claim 15, wherein the battery to-be-charged is the nickel-hydrogen battery, entering the battery to-be-charged into a nickel-hydrogen battery charging mode; when a current charging voltage of the nickel-hydrogen battery reaches a first nickel-hydrogen voltage value, determining that a voltage of the battery to-be-charged is fully charged; and
when the current charging voltage of the nickel-hydrogen battery reaches a second nickel-hydrogen voltage value, determining that the voltage of the battery to-be-charged is fully charged after a preset delay time.

17. The battery charging method according to claim 15, wherein when the battery to-be-charged is the conventional lithium battery, entering the battery to-be-charged into a conventional lithium battery charging mode, and lowering current from constant current to constant voltage; if a current charging voltage of the conventional lithium battery reaches a conventional lithium voltage value, determining that a voltage of the conventional lithium battery is fully charged.

18. The battery charging method according to claim 15, wherein the determining that the battery to-be-charged is the conventional lithium battery enables to be replaced with following:
when the second voltage value is within a third preset voltage range value, determining that the battery to-be-charged is a lithium iron phosphate battery, where the third preset voltage range value is within the first preset voltage range value; when the battery to-be-charged is the lithium iron phosphate battery, entering the battery to-be-charged into a lithium iron phosphate battery charging mode, and lowering current from constant current to constant voltage; if a current charging voltage of the lithium iron phosphate battery reaches a lithium iron phosphate voltage value, determining that a voltage of the lithium iron phosphate battery is fully charged.

19. A battery charging device, configured to charge a battery to-be-charged that is arranged, comprising:
a microprogrammed control unit (MCU);
a charging driving circuit module;
a charging switch circuit module;
a voltage detecting module; and
a current detecting module;
wherein the MCU is electrically connected to the charging driving circuit module, the charging switch circuit module, the voltage detecting module, and the current detecting module, and the MCU achieves the battery charging method according to claim 15.

20. The battery charging device according to claim 19, wherein the MCU controls the charging driving circuit module and the charging switch circuit module to pulse the battery to-be-charged with current at a preset interval time to rise a voltage of the battery to-be-charged and activate the battery to-be-charged.

\* \* \* \* \*